United States Patent [19]

Kitamura et al.

[11] Patent Number: 5,407,881
[45] Date of Patent: Apr. 18, 1995

[54] PROCESS FOR INCREASING THE STRENGTH OF A ZEOLITE MOLDING

[75] Inventors: Masaru Kitamura, Takatsuki; Shuzo Murata, Ibaraki; Kazuya Tsuchimoto, Niihama, all of Japan

[73] Assignee: Sumitomo Chemical Co., Ltd., Osaka, Japan

[21] Appl. No.: 81,101

[22] Filed: Jun. 25, 1993

[30] Foreign Application Priority Data

Jun. 25, 1992 [JP] Japan ................................. 4-167445

[51] Int. Cl.$^6$ .......................... B01J 29/28; B01J 37/10
[52] U.S. Cl. ............................... 502/71; 502/60; 502/64; 502/77
[58] Field of Search ................... 502/60, 64, 71, 77

[56] References Cited

U.S. PATENT DOCUMENTS

| | | | |
|---|---|---|---|
| 3,764,563 | 10/1973 | Minachev et al. | 502/64 |
| 3,846,337 | 11/1974 | Young | 252/437 |
| 3,969,274 | 7/1976 | Frampton | 252/456 |
| 4,324,696 | 4/1982 | Miale | 252/455 Z |
| 4,326,994 | 4/1982 | Haag et al. | 252/455 Z |
| 4,377,469 | 3/1983 | Shihabi | 208/111 |
| 4,418,235 | 11/1983 | Haag et al. | 585/407 |
| 4,483,946 | 11/1984 | Barnes et al. | 523/145 |
| 4,582,815 | 4/1986 | Bowes | 502/64 |
| 4,594,563 | 6/1986 | Hoelderich et al. | 502/64 |
| 4,828,812 | 5/1989 | McCullen et al. | 423/326 |
| 4,912,275 | 3/1990 | Chang et al. | 585/408 |
| 5,051,164 | 9/1991 | Herbst et al. | 208/120 |

FOREIGN PATENT DOCUMENTS

| | | |
|---|---|---|
| 40276 | 11/1981 | European Pat. Off. . |
| 102544 | 3/1984 | European Pat. Off. . |
| 134330 | 3/1985 | European Pat. Off. . |
| 134333 | 3/1985 | European Pat. Off. . |
| 134850 | 3/1985 | European Pat. Off. . |
| 163429 | 12/1985 | European Pat. Off. . |
| 167393 | 1/1986 | European Pat. Off. . |
| 169027 | 1/1986 | European Pat. Off. . |
| 186395 | 7/1986 | European Pat. Off. . |
| 231133 | 8/1987 | European Pat. Off. . |
| 309048 | 3/1989 | European Pat. Off. . |
| 403966 | 12/1990 | European Pat. Off. . |
| 494470 | 7/1992 | European Pat. Off. . |
| 1431686 | 4/1976 | United Kingdom . |
| WO88/08329 | 11/1988 | WIPO . |

*Primary Examiner*—Carl F. Dees
*Attorney, Agent, or Firm*—Cushman Darby & Cushman

[57] ABSTRACT

A process is disclosed wherein a zeolite molding having a high mechanical strength is produced by contacting a pentasil type zeolite molding with water.

11 Claims, No Drawings

PROCESS FOR INCREASING THE STRENGTH OF A ZEOLITE MOLDING

The present invention relates to a process for increasing the strength of a zeolite molding. More particularly, the present invention relates to a process for increasing the strength of a zeolite molding comprising contacting a pentasil type zeolite molding with water.

Further, the present invention relates to a use of a zeolite molding in such applications as mentioned below which molding was prepared by contacting a pentasil type molded zeolite with water.

Still further, the present invention relates to a zeolite molding containing no substantial amount of a binder and having an increased mechanical strength.

A zeolite is a porous crystalline (crystal) containing silicon and oxygen as main components and containing a metal element such as aluminium as a further component according to circumstances. Zeolites have been used for drying and purification of gases, and separation of n-paraffin, n-olefin, and p-xylene taking advantage of their absorption power for gases and liquids. Also, they have been used in many reactions such as decomposition or cracking, hydrogenation, dewaxing, alkylation, dealkylation, and isomerization taking advantage of their catalytic ability in those reactions.

Zeolites are used usually after molded into pellets by an extrusion molding or tablet molding, or after molded into fine particles by a spray dry molding. However, since zeolites are weak in mechanical strength by themselves, they are molded after blended with an inorganic binder such as an alumina, silica-alumina, or silica sol.

Accordingly, many methods have been proposed for molding a zeolite, such as a method in which a zeolite is blended with an alumina and clay, and then subjected to an extrusion molding (Japanese Examined Patent Publication No. 33-9872 and Japanese Unexamined Patent Publication No. 49-67895), a method in which a mixture of a zeolite with a silica is further blended with water and a base of an alkaline metal as an auxiliary for extrusion molding, and then subjected to an extrusion molding (Japanese Unexamined Patent Publication No. 61-26509), a method in which a zeolite is blended with a silica sol and then treated with ammonium phosphate or the like (U.S. Pat. No. 3,846,337), and a method in which a zeolite is blended with water and a silica-alumina, and then subjected to molding to produce a zeolite molded product (Japanese Unexamined Patent Publication, Toku Hyo Hei No. 1-503127).

However, when an inorganic binder was used, there has been a defect that the inherent property of a zeolite is diluted, or lowered in circumstances by the binder existing in a molded zeolite in such a degree corresponding to the amount of the binder, while the mechanical strength of the molded zeolite is increased.

As a result of continued research, under such circumstances, for increasing the mechanical strength of a pentasil type zeolite molding without using an inorganic binder, it has now been found that the purpose can be achieved by subjecting a pentasil type zeolite molding to such a simple treatment as contacting it with water.

An object of the present invention is to provide a process for increasing the strength of a zeolite molding comprising contacting a pentasil type zeolite molding with water.

Now, the present invention will be described in detail.

The pentasil type zeolite molding which can be used in the present invention is a porous crystalline (crystal) containing silicon and oxygen as main components. It may further contain at least one metal element, such as aluminium, gallium, iron, boron, zirconium, chromium, beryllium, cobalt, lanthanum, germanium, titanium, hafnium, vanadium, nickel, antimony, bismuth, copper, and niobium. Particularly, ZSM-5 or ZSM-11 pentasil type zeolite is preferably used in the present invention.

Usually, the zeolites having an atomic ratio of silicon to metal elements other than silicon of 10 or more, preferably 100 or more, more preferably 500 or more, is used. Crystalline super high silica zeolites can also be used which contain no metal elements but substantially only silicon as a constituting elements.

Pentasil type zeolites is usually produced by a hydrothermal synthesis and is, if necessary, subjected to, drying, calcination, and ion exchange. Zeolite moldings used in the present invention may be molded from any one of hydrothermal synthesized product, dried product, calcined product, and ion exchanged product.

In molding of a zeolite, for example, an extrusion, compression, tablet, flow, rolling, or spray molding can be used, and the zeolite can be molded into a desired shape, for example, a shape of a ball, cylinder, plate, ring, or clover.

When pellet-like moldings are required, an extrusion or tablet molding can be used, while when fine particles are required to use as a fluidized bed catalyst, a spray molding can be used. The molding can be performed with a polyvinyl alcohol, methyl cellulose, polyethylene oxide, or wax added as a further component, as occasion demands.

Zeolites having 5 μm or smaller, preferably 1 μm or smaller across of primary particles are usually used for molding.

As explained above, the present invention is characterized in that a pentasil type zeolite is contacted with water, and the water may be in liquid or gas state.

Also, coexistence of an alkali metal hydroxide such as sodium hydroxide and potassium hydroxide, ammonia, or methyl amine is preferable, and the strength of zeolite moldings can further be increased through the coexistence of the compounds.

When an alkali exists together with the water in liquid state, its pH is adjusted usually at 9 or higher and preferably about 9 to 13. Also, when an alkali exists together with the water in gas state, a basic gas such as ammonia and methyl amine is generally used as alkali. In this case, the basic gas is used in an amount of usually 0.01 to 1 mol, preferably 0.1 to 0.5 mol.

A water-soluble organic solvent such as methanol and ethanol may exists together with water. When the water in liquid state is used, salts of alkalis such as hydrochlorides, sulfates, or nitrates of alkalis may coexist.

When the zeolite is to be contacted with water, a method is adopted wherein a zeolite is immersed in water, or a method in which water is flown through a column wherein molded zeolites are filled.

The temperature of the water to be used for the contact is 30° to 100° C. and usually 60° to 100° C. Contact time is usually 5 min to 10 hours, and the contact may repeatedly be carried out at need.

On the other hand, when water in gas state is used, a method is adopted wherein a water in gas state is flown through a column in which molded zeolites are filled, or wherein molded zeolites are held in an atmosphere of gaseous water.

The temperature of the water in gas state to be used for the contact is about 30° to about 200° C., usually 50° to 150° C. Contact time is usually 5 min to 72 hours, and the contact may be repeated at need.

After the contact treatment, zeolite moldings can be washed with water or with an acid such as hydrochloric acid. When washed with an acid, the moldings may further be washed with water.

Through the steps explained above, the strength of a zeolite molding can be increased, and the molding may further be subjected to calcination, if necessary.

According to the present invention, the mechanical strength of a zeolite molding can be increased by subjecting a molded zeolite to such a simple treatment as contacting it with water.

In addition, according to the present invention, the mechanical strength of a zeolite molded product can be increased even when an inorganic binder is not used, and thus, the present invention is advantageous in a commercial production of a zeolite molding.

Further, the zeolite molding of the present invention has an advantage that its inherent favorable properties will not be impaired since it does not contain an inorganic binder. Thus, the present invention is advantageous even from this aspect.

The present invention will now be described in further detail with reference to Referential Examples, Examples, and Comparative Examples. However, it should be understood that the present invention is by no means restricted by such specific Examples.

REFERENCE EXAMPLE 1

In an autoclave having an internal volume of 5 liter and made of stainless steel, 500 g of tetraethylortho-silicate (aluminium content: lower than 10 ppm), 1120 g of a 10% aqueous solution of tetra-n-propyl ammonium hydroxide, and 1070 g of ethanol were charged, and they were vigorously stirred for 120 min. The pH of the liquid mixture was 13.

After the lid of the autoclave was tightened, its contents were subjected to hydrothermal synthesis for 96 hours while keeping the internal temperature of the autoclave at 105° C. with stirring at a rotating speed of more than 400 rpm. The internal pressure of the autoclave was reached up to 2 or 3 kg/cm$^2$ during that period of time. The pH of the contents was 11.8 at the time when the hydrothermal synthesis was terminated.

The white solids (small particles, primary particle size of zeolite: 0.2 μm) thus obtained were separated by filtration and continuously washed with distilled water until the pH of the filtrate was reached to approximately 7 to obtain 300 g of a slurry having a solid content of 40%.

The slurry in an amount of 25 g was subjected to filtration and drying to obtain 10 g of white crystalline solids in powder state. The crystalline solids were analyzed by powder X-ray diffraction to identify to be pentasil type zeolites. Also as a result of atomic absorption analysis, the content of aluminium in the zeolites and Si/Al atomic ratio were found to be 3 ppm and 147000, respectively.

The slurry in an amount of 250 g was concentrated by using a heating kneader. The water content in the slurry obtained was 47%. The slurry was then kneaded with a kneader until torque was reached to 1.2 to 1.4 kg.m, extruded through a die having a hole diameter of 3 mmΦ, dried with air, and then cut into a length of 3 mm to obtain moldings.

Then, the moldings in an amount of 60 g were subjected to calcination at a temperature of 500° to 530° C. for 6 hours under a circulation of a mixed gas of nitrogen with air (volume ratio 1:1) to obtain Solid-A.

REFERENTIAL EXAMPLE 2

Referential Example 1 was repeated to obtain Solid-A'.

REFERENTIAL EXAMPLE 3

In an autoclave having an internal volume of 5 liter and made of stainless steel, 500 g of tetraethylortho-silicate (aluminium content: lower than 10 ppm), 1120 g of a 10% aqueous solution of tetra-n-propyl ammonium hydroxide, and 542 g of water in which 27.6 g of Al$_2$(SO$_4$)$_3$. 13–14H$_2$O was dissolved in advance were charged, and they were vigorously stirred for 120 min. The pH of the liquid mixture was 11.7. After the lid of the autoclave was tightened, its contents were subjected to hydrothermal synthesis for 96 hours while keeping the internal temperature of the autoclave at 105° C. with stirring at a rotating speed of more than 400 rpm. The internal pressure of the autoclave was reached to 2 to 3 kg/cm$^2$ during that period of time. The pH of the contents was 11.7 at the time when the hydrothermal synthesis was terminated.

The white solids thus obtained were separated by filtration and continuously washed with distilled water until the pH of the filtrate was reached to approximately 7 to obtain 300 g of a slurry having a solid content of 40%.

The slurry in an amount of 25 g was subjected to filtration and drying to obtain 10 g of white crystalline solids in powder state. The crystalline solids were analyzed by powder X-ray diffraction to identify to be pentasil type zeolites. As a result of atomic absorption analysis, the ratio of Si/Al was found to be 60.

The slurry in an amount of 250 g was concentrated by using a heating kneader. The water content in the slurry obtained was 47%. The slurry was then kneaded with a kneader until torque was reached to 1.2 to 1.4 kg.m, extruded through a die having a hole diameter of 3 mmΦ, dried with air, and then cut into a length of 3 mm to obtain moldings.

Then, the moldings in an amount of 60 g were subjected to calcination at a temperature of 500° to 530° C. for 6 hours under a circulation of a mixed gas of nitrogen with air (volume ratio 1:1) to obtain Solid-B.

REFERENTIAL EXAMPLE 4

In an autoclave having an internal volume of 5 liter and made of stainless steel, 416.7 g of tetraethylorthosilicate (aluminium content: lower than 10 ppm), 931.4 g of a 10% aqueous solution of tetra-n-propyl ammonium hydroxide, 249.3 g of ethanol, and 0.3 g of titanium tetraisopropoxide were charged, and they were vigorously stirred for 60 min.

After the lid of the autoclave was tightened, its contents were subjected to hydrothermal synthesis for 96 hours while keeping the internal temperature of the autoclave at 105° C. with stirring at a rotating speed of more than 400 rpm. The white solids thus obtained were separated by filtration and continuously washed with distilled water until the pH of the filtrate was reached to approximately 7 to obtain 250 g of a slurry having a solid content of 40%.

The slurry in an amount of 25 g was subjected to filtration and drying to obtain 10 g of white crystalline solids in powder state. The crystalline solids were analyzed by powder X-ray diffraction to identify to be titanosilicates having a pentasil type structure. As a result of atomic absorption analysis, the ratio of Si/Ti was found to be 3500.

The slurry in an amount of 200 g was concentrated by using a heating kneader. The water content in the slurry obtained was 47%. The slurry was then kneaded with a kneader until torque was reached to 1.2 to 1.4 kg.m, extruded through a die having a hole diameter of 3 mm$\phi$, dried with air, and then cut into a length of 3 mm to obtain moldings.

Then, the moldings in an amount of 40 g were subjected to calcination at a temperature of 500° to 530° C. for 6 hours under a circulation of a mixed gas of nitrogen with air (volume ratio 1:1) to obtain Solid-C.

REFERENTIAL EXAMPLE 5

The hydrothermal synthesis and washing in Referential Example 1 were repeated to obtain 300 g of a slurry having a solid content of 40%.

To 250 g of the slurry, 50 g of water in which 4 g of a polyvinyl alcohol was dissolved in advance was mixed, and then the mixture was concentrated by using a heating kneader. The water content in the slurry obtained was 47%. The slurry was kneaded with a kneader until torque was reached 1.2 to 1.4 kg.m, extruded through a die having a hole diameter of 3 mm$\phi$, dried with air, and then cut into a length of 3 mm to obtain moldings.

Then, the moldings in an amount of 60 g were subjected to calcination at a temperature of 500° to 530° C. for 6 hours under a circulation of a mixed gas of nitrogen with air (volume ratio 1:1) to obtain Solid-D.

REFERENTIAL EXAMPLE 6

The hydrothermal synthesis and washing in Referential Example 1 were repeated to obtain 300 g of a slurry having a solid content of 40%.

The slurry in an amount of 250 g was separated by filtration, and white solids thus obtained were dried at a temperature of 120° C. for 16 hours and then pulverized with a ball mill.

The pulverized product in an amount of 100 g was mixed with 50 g of water in which 4 g of a polyvinyl alcohol was dissolved in advance, kneaded with a kneader until torque was reached to 1.2 to 1.4 kg.m, extruded through a die having a hole diameter of 3 mm$\phi$, dried with air, and then cut into a length of 3 mm to obtain moldings.

Then, the moldings in an amount of 40 g were subjected to calcination at a temperature of 500° to 530° C. for 6 hours under a circulation of a mixed gas of nitrogen with air (volume ratio 1:1) to obtain Solid-E.

REFERENTIAL EXAMPLE 7

The hydrothermal synthesis and washing in Referential Example 1 were repeated to obtain 300 g of a slurry having a solid content of 40%. The slurry was subjected to filtration, and the white solids thus obtained were dried at a temperature of 120° C. for 6 hours and then pelletized into particles of 8 to 16 mesh.

The particles were subjected to calcination at a temperature of 500° to 530° C. for 6 hours under a circulation of a mixed gas of nitrogen with air (volume ratio 1:1) and then pulverized with a mortar.

The pulverized product in an amount of 80 g was added with 800 ml of a 7.5% by weight of aqueous solution of ammonium chloride, subjected to ion exchange at a temperature of 70° C. for 1 hour, and then separated by filtration. After the ion exchange was conducted 4 times in total, the product was washed with distilled water, dried at a temperature of 120° C., and then further pulverized with a ball mill.

The further pulverized product in an amount of 50 g was mixed with 27.5 g of water in which 2 g of a polyvinyl alcohol was dissolved in advance, kneaded with a kneader until torque was reached to 1.2 to 1.4 kg.m, extruded through a die having a hole diameter of 3 mm$\phi$, dried with air, and then cut into a length of 3 mm to obtain Solid-F.

REFERENTIAL EXAMPLE 8

The hydrothermal synthesis and washing in Referential Example 1 were repeated to obtain 300 g of a slurry having a solid content of 40%. The slurry in amount of 250 g was separated by filtration, and the white solids thus obtained were dried at a temperature of 120° C. for 16 hours and then pulverized with a ball mill. The pulverized product in an amount of 100 g was mixed with 50 g of water in which 4 g of a polyvinyl alcohol was dissolved in advance, kneaded with a kneader until torque was reached to 1.2 to 1.4 kg.m, extruded through a die having a hole diameter of 5 mm$\phi$ in which a needle having a diameter of 2 mm$\phi$ was arranged, dried with air, and then cut into a length of 5 mm to obtain ring like moldings having an outside diameter of 5 mm and an inside diameter (hole diameter) of 2 mm.

Then, the moldings were subjected to calcination at a temperature of 500° to 530° C. for 6 hours under a circulation of a mixed gas of nitrogen with air (volume ratio 1:1) to obtain Solid-G.

REFERENTIAL EXAMPLE 9

The hydrothermal synthesis and washing in Referential Example 1 were repeated to obtain 240 g of a slurry containing 50% of solid catalysts. The same procedure was further repeated twice, and 720 g of a slurry obtained by mixing the slurries was subjected to a spray drying with an atomizer type spray drier to form fine particles. The average inlet temperature and average outlet temperature of the spray drier were 210° C. and 90° C., respectively.

Then, 250 g of the white fine particles thus obtained were subjected to calcination in a rotary kiln at a temperature of 500° to 530° C. for 6 hours under a circulation of a mixed gas of nitrogen with air (volume ratio 1:1) to obtain Solid-H. The average particle size of the Solid-H was 80 $\mu$m.

EXAMPLE 1

In an autoclave, 20 g of Solid-A prepared in Referential Example 1 and 200 g of an aqueous ammonia having a pH of 11.5 and prepared from a 28% (by weight) aqueous ammonia and distilled water were charged, and they were stirred at a temperature of 90° C. for 1 hour. The aqueous ammonia was separated by decantation. This alkali treatment was conducted 3 times in total. Then, the solids were separated by filtration, washed with water, and dried at 120° C. for 16 hours to obtain alkali treated moldings.

The mechanical strength of the moldings was determined with a Kiya's hardness meter. An average value of the results of determination for 10 moldings are shown in Table 1.

EXAMPLE 2

Example 1 was repeated to obtain moldings except that 200 g of a liquid mixture having a pH of 11.5 and prepared from 80 g of a 7.5% (by weight) aqueous solution of ammonium chloride and 120 g of a 28% (by weight) aqueous ammonia was used instead of aqueous ammonia.

The mechanical strength of the moldings was determined by the same method as in Example 1. An average value of the results of determination for 10 moldings are shown in Table 1.

EXAMPLE 3

Example 1 was repeated to obtain moldings except that 5 g of Solid-A was used, and 50 g of a 7.5% (by weight) aqueous solution of ammonium chloride having a pH of 5.8 was used instead of aqueous ammonia.

The mechanical strength of the moldings was determined by the same method as in Example 1. An average value of the results of determination for 10 moldings are shown in Table 1.

EXAMPLE 4

Example 1 was repeated to obtain moldings except that 20 g of Solid-A' instead of solid-A and 200 g of distilled water instead of aqueous ammonia were used, and the treatment temperature was adjusted to 100° C.

The mechanical strength of the moldings was determined by the same method as in Example 1. An average value of the results of determination for 10 moldings are shown in Table 1.

EXAMPLE 5

Solid-A' in an amount of 5 g was filled in a column (15 mm$\phi$) made of silica glass and heated up to 80° C. under a circulation of a nitrogen gas of 4.2 liter/hr. Then, another nitrogen gas of 4.2 liter/hr accompanied by water prepared by bubbling nitrogen gas in water kept at 20° C. was supplied to the column instead of the gas of nitrogen only. After holding the column for 24 hours, the gas to be supplied was again changed to a nitrogen gas accompanied by no water and the column was cooled down to 20° C. to form an objective moldings.

The mechanical strength of the moldings was determined by the same method as in Example 1. An average value of the results of determination for 10 moldings are shown in Table 1.

COMPARATIVE EXAMPLE 1

The mechanical strength of Solid-A obtained in Referential Example 1 was determined by the same method as in Example 1. An average value of the results of determination for 10 moldings are shown in Table 1.

COMPARATIVE EXAMPLE 2

The mechanical strength of Solid-A' obtained in Referential Example 2 was determined by the same method as in Example 1. An average value of the results of determination for 10 moldings are shown in Table 1.

TABLE 1

| Example | Strength (kg) | |
|---|---|---|
| | Lengthwise direction | Crosswise direction |
| Example 1 | 4.5 | 4.5 |
| Example 2 | 4.6 | 4.5 |
| Example 3 | 1.0 | 0.6 |
| Comparative Example 1 | 0.2 | 0.1 |
| Example 4 | 0.9 | 0.6 |
| Example 5 | 1.1 | 0.8 |
| Comparative Example 2 | 0.2 | 0.1 |

EXAMPLE 6

Example 1 was repeated to obtain moldings except that 20 g of Solid-B obtained in Referential Example 3 was used instead of Solid-A obtained in Referential Example 1.

The mechanical strength of the moldings was determined by the same method as in Example 1. An average value of the results of determination for 10 moldings are shown in Table 2.

COMPARATIVE EXAMPLE 3

The mechanical strength of Solid-B obtained in Referential Example 3 was determined by the same method as in Example 1. An average value of the results of determination for 10 moldings are shown in Table 2.

TABLE 2

| Example | Strength (kg) | |
|---|---|---|
| | Lengthwise direction | Crosswise direction |
| Example 6 | 0.17 | 0.15 |
| Comparative Example 3 | 0.05 | 0 |

EXAMPLE 7

Example 1 was repeated to obtain moldings except that 20 g of Solid-C obtained in Referential Example 4 was used instead of Solid-A obtained in Referential Example 1.

The mechanical strength of the moldings was determined by the same method as in Example 1. An average value of the results of determination for 10 moldings are shown in Table 3.

COMPARATIVE EXAMPLE 4

The mechanical strength of Solid-C obtained in Referential Example 4 was determined by the same method as in Example 1. An average value of the results of determination for 10 moldings are shown in Table 3.

TABLE 3

| Example | Strength (kg) | |
|---|---|---|
| | Lengthwise direction | Crosswise direction |
| Example 7 | 4.2 | 4.0 |
| Comparative Example 4 | 0.7 | 0.5 |

EXAMPLE 8

Example 1 was repeated to obtain moldings except that 20 g of Solid-D obtained in Referential Example 5 was used instead of Solid-A obtained in Referential Example 1.

The mechanical strength of the moldings was determined by the same method as in Example 1. An average value of the results of determination for 10 moldings are shown in Table 4.

EXAMPLE 9

Example 8 was repeated to obtain moldings except that 200 g of an aqueous solution of sodium hydroxide having a pH of 11.5 and prepared from sodium hydroxide and distilled water was used instead of an aqueous ammonia.

The mechanical strength of the moldings was determined by the same method as in Example 1. An average value of the results of determination for 10 moldings are shown in Table 4.

COMPARATIVE EXAMPLE 5

The mechanical strength of Solid-D obtained in Referential Example 5 was determined by the same method as in Example 1. An average value of the results of determination for 10 moldings are shown in Table 4.

TABLE 4

| Example | Strength (kg) | |
| --- | --- | --- |
|  | Lengthwise direction | Crosswise direction |
| Example 8 | 3.6 | 3.4 |
| Example 9 | 5.5 | 4.4 |
| Comparative Example 5 | 0.8 | 0.6 |

EXAMPLE 10

Example 1 was repeated to obtain moldings except that 20 g of Solid-E obtained in Referential Example 6 was used instead of Solid-A obtained in Referential Example 1.

The mechanical strength of the moldings was determined by the same method as in Example 1. An average value of the results of determination for 10 moldings are shown in Table 5.

COMPARATIVE EXAMPLE 6

The mechanical strength of Solid-E obtained in Referential Example 6 was determined by the same method as in Example 1. An average value of the results of determination for 10 moldings are shown in Table 5.

TABLE 5

| Example | Strength (kg) | |
| --- | --- | --- |
|  | Lengthwise direction | Crosswise direction |
| Example 10 | 12.5 | 8.0 |
| Comparative Example 6 | 1.1 | 1.1 |

EXAMPLE 11

Example 1 was repeated to obtain moldings except that 20 g of Solid-F obtained in Referential Example 7 was used instead of Solid-A obtained in Referential Example 1.

The mechanical strength of the moldings was determined by the same method as in Example 1. An average value of the results of determination for 10 moldings are shown in Table 6.

COMPARATIVE EXAMPLE 7

The mechanical strength of Solid-F obtained in Referential Example 7 was determined by the same method as in Example 1. An average value of the results of determination for 10 moldings are shown in Table 6.

TABLE 6

| Example | Strength (kg) | |
| --- | --- | --- |
|  | Lengthwise direction | Crosswise direction |
| Example 11 | 4.5 | 3.0 |
| Comparative Example 7 | 0.4 | 0.4 |

EXAMPLE 12

Example 1 was repeated to obtain moldings except that 20 g of Solid-G obtained in Referential Example 8 was used instead of Solid-A obtained in Referential Example 1.

The mechanical strength of the moldings was determined by the same method as in Example 1. An average value of the results of determination for 10 moldings are shown in Table 7.

COMPARATIVE EXAMPLE 8

The mechanical strength of Solid-G obtained in Referential Example 8 was determined by the same method as in Example 1. An average value of the results of determination for 10 moldings are shown in Table 7.

TABLE 7

| Example | Strength (kg) | |
| --- | --- | --- |
|  | Lengthwise direction | Crosswise direction |
| Example 12 | 3.4 | 1.7 |
| Comparative Example 8 | 0.2 | 0.1 |

EXAMPLE 13

Solid-H obtained in Referential Example 9 in an amount of 60 g was placed in a petri dish and suspended in an autoclave containing an internal volume of 1 liter, made of stainless steel, and having 200 g of water therein. After the lid was tightened, the autoclave was immersed in a constant temperature bath kept at 80° C. and allowed to stand for 6 hours. After taking the autoclave out of the bath, it was cooled down to 20° C. by leaving the autoclave alone. The fine particles thus obtained were subjected to calcination in a rotary kiln at 500° C. for 1 hour under circulation of a nitrogen gas to obtain objective moldings. The moldings in an amount of 50 g was fluidized in a column (127 mm$\phi$ and 559 mm long) made of stainless steel by supplying air of 7 liter/hr for 20 hours from a bottom of the column, and the powdering (or degradation) ratio during that time was determined. The result of the determination is shown in Table 8.

The powdering ratio was calculated by the following equation, which corresponds to abrasion resistance of moldings.

Powdering ratio (%) = $Z/(X-Y) \times 100$ wherein X = Total weight (g) of moldings initially filled in a column Y = Weight (g) of powdered fine particles blown from an upper part of a column until 5 hours after initiation of air blowing Z = Weight (g) of powdered fine particles blown from an upper part of a column from 5 to 20 hours after initiation of air blowing.

EXAMPLE 14

Example 13 was repeated to obtain moldings except that 200 g of a 28 % aqueous ammonia was charged in the autoclave instead of water.

The powdering ratio of the moldings thus obtained was determined by the same method as in Example 13. The result of the determination is shown in Table 8.

COMPARATIVE EXAMPLE 9

The powdering ratio of Solid-H obtained in Referential Example 9 was determined. The result of the determination is also shown in Table 8.

TABLE 8

| Example | Powdering ratio (%) |
|---|---|
| Example 13 | 2.8 |
| Example 14 | 2.3 |
| Comparative Example 9 | 25.5 |

REACTION EXAMPLE 1

The moldings obtained in Example 13 in an amount of 5 g was added with 50 g of a 5 % aqueous solution of ammonium chloride, subjected to ion exchange at a temperature of 60 to 70° C. for 1 hour, and then separated by filtration. After this ion exchange treatment was repeated 4 times in total, the crystals thus obtained were washed with distilled water until chloride ions became to undetectable in the filtrate, and then dried at 120° C. for 16 hours. The crystals were further subjected to calcination in a rotary kiln at 500° C. for 1 hour under circulation of nitrogen gas to obtain Catalyst-A.

The Catalyst-A in an amount of 0.375 g (0.6 ml) was filled in a reaction tube made of silica glass and having an inside diameter of 1 cm and preheated at 350° C. for 1 hour under circulation of nitrogen gas of 4.2 liter/hr. Then, a liquid mixture of cyclohexanone oxyme/methanol at a weight ratio of 1/1.8 was supplied to the reaction tube at a rate of 8.4 g/hr to react. The space velocity WHSV at that time was 8 hr$^{-1}$, and the temperature of a catalyst layer (reaction temperature) was 350° C. Reaction was continued for 7.25 hours. Reaction products were collected every hour while cooling with water and analyzed by a gaschromatography.

The space velocity WHSV, conversion of cyclohexanone oxyme, and selectivity of β-caprolactam were calculated by using the following equations, respectively.

WHSV (hr$^{-1}$) = O/C
Conversion of cyclohexanone oxyme (%) = [(X−Y)/X] × 100
Selectivity of β-caprolactam (%) = [Z/(X−Y)] × 100
wherein O, C, X, and Y are defined as follows:
O = Supplying rate of cyclohexanone oxyme (kg/hr)
C = Weight of catalyst (kg)
X = Number of mols of cyclohexanone oxyme supplied as a raw material
Y = Number of mols of unreacted cyclohexanone oxyme
Z = Number of mols of β-caprolactam in a product The results of the reaction are shown in Table 9.

REACTION EXAMPLE 2

Reaction Example 1 was repeated to obtain Catalyst-B except that 5 g of Solid-H obtained in Referential Example 9 was used. Using the Catalyst-B, the same procedures as in Reaction Example 1 were conducted to obtain β-caprolactam from cyclohexanone oxyme. The results of the reaction are also shown in Table 9.

TABLE 9

| Example | | Reaction time elapsed | |
|---|---|---|---|
| | | 1.25 (hr) | 7.25 (hr) |
| Reaction Example 1 | Conversion (%) | 99.8 | 99.6 |
| | Selectivity (%) | 95.0 | 95.6 |
| Reaction Example 2 | Conversion (%) | 99.9 | 99.9 |
| | Selectivity (%) | 95.6 | 95.8 |

We claim:

1. A process for increasing the strength of a zeolite molding comprising contacting a porous crystalline pentasil zeolite molding, wherein said pentasil zeolite contains silicon and oxygen and may contain at least one metal element selected from the group consisting of aluminum, gallium, iron, boron, zirconium, chromium, beryllium, cobalt, lanthanum, germanium, titanium, hafnium, vanadium, nickel, antimony, bismuth, copper, and niobium, with water at a temperature of 30° C. to 200° C.

2. The process for increasing the strength of a zeolite molding according to claim 1, wherein the pentasil type zeolite molding has an atomic ratio of silicon to metal elements other than silicon of 10 or more.

3. The process for increasing the strength of a zeolite molding according to claim 1, wherein the water is in liquid state.

4. The process for increasing the strength of a zeolite molding according to claim 3, wherein an alkali exists together with the water.

5. The process for increasing the strength of a zeolite molding according to claim 4, wherein the alkali is a compound selected from the group consisting of an alkali metal hydroxide, ammonia, and methyl amine.

6. The process for increasing the strength of a zeolite molding according to claim 4, wherein the water has a pH of 9 or higher.

7. The process for increasing the strength of a zeolite molding according to claim 4, wherein the water has a temperature of 30° to 100° C. and contact time is 5 min to 10 hours.

8. The process for increasing the strength of a zeolite molding according to claim 1, wherein the water is in gas state.

9. The process for increasing the strength of a zeolite molding according to claim 8, wherein the water further contains an alkali.

10. The process for increasing the strength of a zeolite molding according to claim 9, wherein the alkali is a compound selected from the group consisting of ammonia and methyl amine.

11. The process for increasing the strength of a zeolite molding according to claim 9, wherein the amount of the alkali is 0.01 to 1 mol per 1 mol of the water.

* * * * *